US010108573B1

(12) United States Patent
Manohar

(10) Patent No.: US 10,108,573 B1
(45) Date of Patent: Oct. 23, 2018

(54) TRANSFORMATIONAL ARCHITECTURE FOR MULTI-LAYER SYSTEMS

(71) Applicant: Optel Networks, Inc., San Jose, CA (US)

(72) Inventor: Amar S. Manohar, San Jose, CA (US)

(73) Assignee: Optel Networks, Inc., San Jose, CA (US)

( * ) Notice: Subject to any disclaimer, the term of this patent is extended or adjusted under 35 U.S.C. 154(b) by 464 days.

(21) Appl. No.: 14/726,262

(22) Filed: May 29, 2015

Related U.S. Application Data

(60) Provisional application No. 62/004,726, filed on May 29, 2014.

(51) Int. Cl.
*G06F 13/40* (2006.01)
*G06F 13/42* (2006.01)

(52) U.S. Cl.
CPC ...... *G06F 13/4022* (2013.01); *G06F 13/4221* (2013.01)

(58) Field of Classification Search
None
See application file for complete search history.

(56) References Cited

U.S. PATENT DOCUMENTS

| 2011/0103799 A1* | 5/2011 | Shacham | H04B 10/25 398/115 |
| 2012/0219005 A1* | 8/2012 | Durve | H04L 47/41 370/400 |
| 2013/0117766 A1* | 5/2013 | Bax | G06F 9/4405 719/323 |
| 2013/0212411 A1* | 8/2013 | Nicholson | H04L 12/10 713/310 |

\* cited by examiner

*Primary Examiner* — Andrew Lai
*Assistant Examiner* — Harry H Kim
(74) *Attorney, Agent, or Firm* — David H. Jaffer; Pillsbury Winthrop Shaw Pittman LLP

(57) ABSTRACT

The new architecture disclosed herein exploits advances in system and chip technologies to implement a scalable multi-port open network. Using System-on-a-Chip (SOCs) and/or Multi-Chip-Module (MCM) technology, the architecture is implemented to efficiently handle multi-port switching. The novelty lies in using multi-core computing model in the data, control and management planes of multi-port networking cards implemented as an elemental scalable system (ESS) comprising N number of Elemental Units (EUs). EUs comprise device arrays on an integrated circuit (IC) platform using integrated silicon photonics or discrete electro-optics. TX4M™ system architecture therefore includes multiple EUs, switch fabric, multi-core central processing unit (CPU), multi-port power management module with embedded programmable logic, a back plane interface (BPI) as well as selectable functions for front plane interface (FPI) implemented in FPGAs for integration of front plane interface optics on host or on pluggable modules.

17 Claims, 5 Drawing Sheets

TRANSFORMATIONAL ARCHITECTURE FOR MULTI-LAYER SYSTEMS

CROSS-REFERENCE TO RELATED APPLICATIONS

This application claims the benefit under 35 USC 119(e) of prior U.S. Provisional Patent Application No. 62/004,726, filed May 29, 2014, the disclosure of which is hereby incorporated by reference in its entirety.

FIELD OF THE DISCLOSURE

This disclosure relates to an improved and condensed architecture for multi-layer open networks. Applications include data communication and telecommunication network applications, as well as consumer and defense applications. Particular application includes access, aggregation and core multi-tier design for data centers. Specifically, this disclosure addresses how system cards are architected and partitioned at the lower layers of the communication protocol for multi-port datacom, telecom, cloud computing networks, and other computer networks for consumer and defense applications.

BACKGROUND OF THE RELATED ART

Multi-layer open networking models, such as the seven-layer Open System Interconnection (OSI) model, have been known for quite some time now. The multi-layer models typically have lower layers dedicated to transport services (such as physical layer, data link layer, routing and switching layer, and transport layer), and upper layers dedicated to session control, data presentation and data manipulation services. The components at lower layers of the communication protocol have evolved from single to dual to mutli-ports on a network card that brings network data to the network switch.

While moving to a more robust high-speed environment, network administrators need to ensure that appropriate bandwidth is available in both physical and virtual environments for all resources. This is where the concept of partitioning is pivotal in a multi-port network switch, as each port or a bank of ports can be configured independently for intelligent bandwidth provisioning. Since the provisioning is automated, it is sometimes called "zero-touch" provisioning. Intelligent network partitioning allows administrators to split up the total bandwidth pipeline into discrete partitions and dynamically allocate appropriate bandwidth to each partition based on user demand. A partition allows complete physical isolation and division of networking and storage resources, and administrators can dynamically assign these resources on a per-partition basis at varying granularity. Network Interface Card (NIC) is a circuit board or card that controls partitioning. NIC partitioning is typically switch-agnostic and works with a variety of standard Ethernet switches. Partitioning features are usually incorporated in blade servers.

Cutting-edge processing technology driven primarily by leading semiconductor suppliers has made possible integration of several network components on network cards, because most components at lower communication layers are part of the standard product offerings by component suppliers and original equipment manufacturers (OEMs) of systems. But this component supply and manufacturing ecosystem forced the industry to adopt only certain types of partitioning design with discrete components and external interfaces. In a multi-layer printed circuit board (PCB) embodiment of a network card, transmission lines between the PCB layers lead to significant amount of power dissipation. High density nature of the PCBs with numerous ports operating at 10 Gb/s and beyond leads to dense and longer trace lengths adding significant routing complexity and power dissipation. The routing complexity is the leading cause of increase in layer count in the PCBs. Currently PCBs frequently consist of 28 to 32 layers or even more. This leads to enormous board complexity impacting manufacturing yields and quality and/or reliability of the systems.

What is needed is a compact design so that all the network card functionalities including intelligent bandwidth provisioning are available in a power and area-efficient integrated circuit platform in a highly scalable manner.

SUMMARY OF THE DISCLOSURE

The new architecture disclosed herein (code-named TX4M™ Architecture being developed by Optel Networks based in San Jose, Calif.) leverages advances in system and chip technologies to implement an elemental scalable system (ESS) between the front plane and the back plane interfaces, built for handling open network protocols. Using System-on-a-Chip (SOCs) and/or Multi-Chip-Module (MCM) technology, the architecture is implemented to efficiently handle multi-port network switching. The concept is similar to multi-core processors for computing. The novelty lies in using multi-core computing in the data, control and management planes of multi-port networking cards, implemented as integrated circuit (IC) on a PCB. By condensing more and more network functionalities into ICs and vertical integration of modules, this architecture eliminates many PCB layers without compromising port configurability and partitioning functionalities. Integration of optics and electronics on a single substrate enables signal conditioning, routing, switching and bandwidth provisioning at low power in a scalable manner.

BRIEF DESCRIPTION OF THE DRAWINGS

These and other aspects and features of the present disclosure will become apparent to those ordinarily skilled in the art upon review of the following description of specific embodiments of the disclosure in conjunction with the accompanying figures, wherein.

DETAILED DESCRIPTION OF THE PREFERRED EMBODIMENTS

Figure 1:
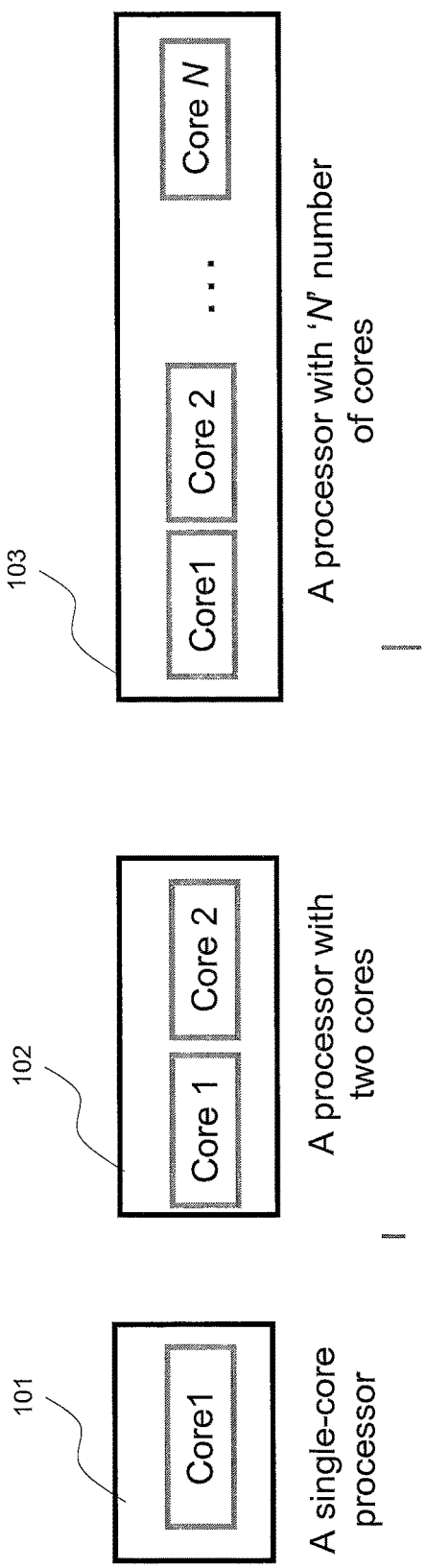
FIG. 1 shows a block diagram of how multi-core processors are used in computing applications.

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Wherever convenient, the same reference numbers/labels will be used throughout the drawings to refer to same or like parts. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

With emergence of Software Defined Networks (SDN), the complexity in the control and management plane is expected to increase compared to today's simpler control and management planes. However, data planes will not see the complexity go down as a result. There is ever more demand to maximize the processing of packets in the data plane as fast and as efficiently as possible. The focus is on programmability of the data planes with selectable functions that can be controlled and managed by the control and management planes respectively. Today's data planes are highly inefficient in power and area usage mainly because they are inefficiently partitioned and lack programmability. Leveraging advances in SOC and MCM technology (such as, stacked-die, multi-chip die-to-die, and module stacking on a much-lower layer card or daughter card compared to today's cards frequently containing more than 26 layers, typically 28-32 layers) enables implementation of systems that are highly efficient in power and area.

The current disclosure relates to design of network cards/line cards for datacom and telecom networks as well as consumer and defense applications. In general, the disclosure focuses on the system solutions to the lower layers of a multi-layer open networking protocol. Particularly, these network cards would be useful for data center switches (access, aggregation and core) including top of the rack (TOR) switches and network access controllers (NACs) for bandwidth partitioning and other networking applications. A group of switches/TORs or NACs, may be included in a multi-slot (e.g., 4-slot, 8-slot, 10-slot or 18-slot or any arbitrary number of slots) chassis. The switching architecture is highly scalable. An elemental scalable system (ESS) has many components, most of the components being implemented on an IC platform. The TX4M™ switch is made of elemental units (EUs) that comprise device arrays on an IC platform. Multiple EUs are grouped for an ESS for TX4M™ system/switch. The TX4M™ switch comprises the EUs, a switching fabric coupled to all the EUs, a back plane interface (BPI) coupled to the switching fabric, a multi-core CPU for port-management, and a multi-port power management module with embedded field programmable gate arrays (FPGAs)/programmable logic devices (PLDs). The front plane interface (FPI) comprising a plurality of network interface module is external to the EUs in one embodiment of ESS. However, eventually with increased integration, the FPI may constitute part of the ESS. An ESS embodiment is described in detail with respect to FIG. 5.

Figure 2:
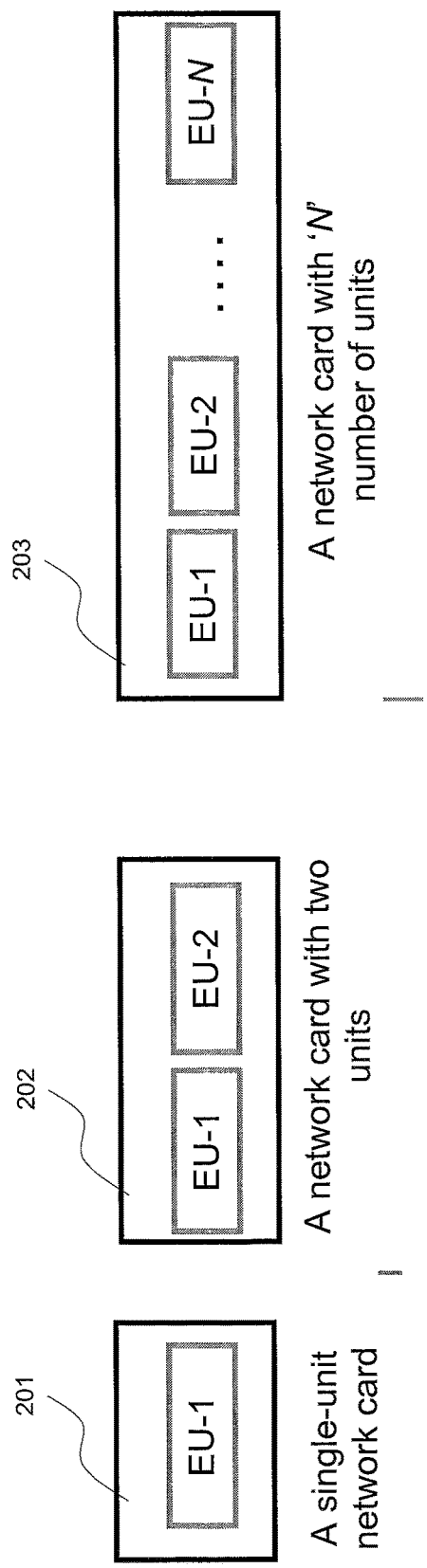
FIG. 2 shows a block diagram of the extension of the multi-core computing concept in networking, according to an embodiment of the present disclosure, where multi-element network cards are used to control and manage multi-port networks.

Semiconductor processing advancement has made multi-core processing a reality in the computing applications. There are some basic similarities between multi-core processing and multi-port networking. FIG. 1 shows the computing example where multi-core processors are used. The processing power of a single computer element is multiplied by a factor of N, where N stands for the number of cores without similar increase in the other elements (e.g., memory, peripherals, I/Os etc.). In FIG. 1, a single core processor 101 has one core. A dual core processor 102 has two cores. An N-core processor 103 has N umber of cores (Core 1, Core 2, . . . Core N). Similarly, FIG. 2 shows the networking equivalent. The processing power of a network card/line card is multiplied by a factor of N, where N stands for the number of elemental units (EUs) without similar increase in the other components (memory, peripherals, I/Os etc.). In FIG. 2, a single-unit network card 201 has one EU, a dual-unit network card 202 has two EUs, and an N-unit network card 203 has N number of EUs. For example, in FIG. 5 described in greater detail below, the term 'elemental unit' encompasses a set of physical layer devices and link layer devices including their own standardized network interfaces, and there are N number of those EUs in an ESS. Elemental units can be arrayed, i.e., repeated on an integrated circuit in order to harness greater density of functionality without the corresponding increase in power dissipation and real estate. A single N-unit network card replaces N number of separate single-unit cards, making the system highly scalable.

The current network architecture is at least partially implemented on one or more chips. With increased integration, a future embodiment of the ESS can be called 'network-on-a-chip.' In the embodiment shown in FIG. 5, not all the components are implemented on a single network chip, but brings together multiple chips on a single network access card PCB. Integration of the networking components at a given layer is made possible mainly because of the evolution of the underlying semiconductor process technology to finer geometries going from transistor gate lengths of a few microns to sub-microns, and even into the 10s of nanometer range. Persons skilled in the art would appreciate that the architecture is amenable to be customized to interface a number of custom or off-the-shelf integrated circuits using glue logic circuitry. Glue logic is a special form of digital circuitry that allows different types of logic chips or circuits to work together by acting as an interface between them. As an example, a chip may contain a central processing unit (CPU) and a random access memory (RAM) block. These circuits can be interfaced within the chip using glue logic, so that they work smoothly together. On printed circuit boards, glue logic can take the form of discrete integrated circuits in their own packages. In more complicated embodiments, programmable logic devices (PLDs)/field programmable gate arrays (FPGA) can play the role of glue logic. Other functions of glue logic include decoding, interfacing to peripherals, circuits to protect against electrostatic discharge or electromagnetic pulses, and the prevention of unauthorized access by proper encryption.

Figure 3:
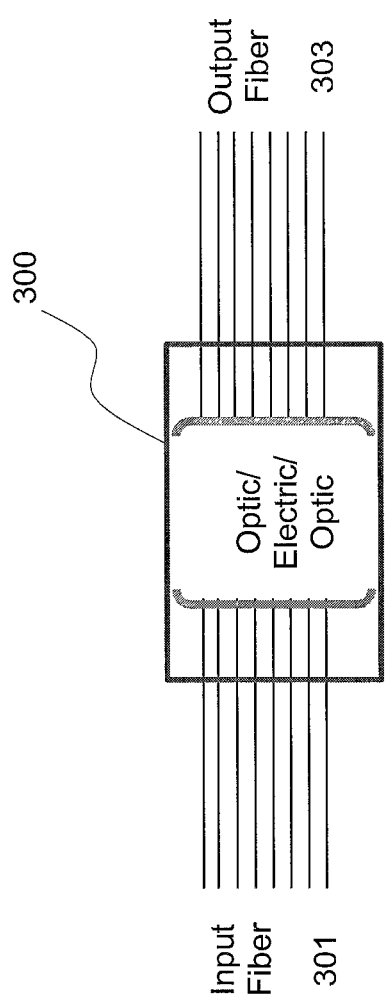
FIG. 3 shows an optical-to-electrical-to-optical interface for a network card, according to an embodiment of the present disclosure.

The new architecture disclosed here not only leverages advances in chip technology, but also emphasizes on the design of the interconnects, as signal degradation and power loss are directly correlated with number and efficiency of interconnects. The integration of optics in core chip substrates (e.g., silicon photonics) is the key to design efficient interconnects. Leveraging semiconductor processes allows one to implement low-level optical p-i-n diodes and/or verical cavity surface emitting laser (VCSEL) arrays and/or photodiodes that enable chip-to-chip interconnection and thus offer seamless merging of electronics and optics. This is not unlike the emergence of Bi-CMOS technology from high performance Bipolar in physical layer (PHY) devices to CMOS in Logical Link Control (LLC) layer devices for digital circuits. Where it was difficult or not economical, the pieces of physical layer devices were implemented in Bipolar as discrete components, but with advances in Bi-CMOS/CMOS technologies, they eventually merged with digital devices to single chip implementation in CMOS. In a similar vein, the efficiency of parallel optics (free-space optics or fiber optics) in CMOS substrates varies and is to be implemented as discrete components or embedded components depending on partitioning and the chip to chip interconnect requirements. FIG. 3 shows an example where incoming signals coming to the FPI are optical, carried by an input fiber set 301. The optical signal is converted to electrical signal for signal conditioning and processing and signal routing and switching within the circuit 300, and then re-converted to optical signal again for further transport down the network via an output fiber set 303. Persons skilled in the art would appreciate that with integration of photonic integrated circuits with electronic circuits, opto-electro-opto (OEO) conversion may be customized based on the switching architecture. Depending on the architecture, a suitable material system is to be chosen, for example silicon, silicon germenium (SiGe), gallium arsenide (GaAs) based integrated and/or discrete components etc.

In summary, the new architecture uses multi-faceted integration employing System-on-a-chip (SOC), Silicon Photonics, Multi-chip modules (MCM) as well as nano-optics/nano-wire technologies to significantly reduce the board power, area, and complexity. The new architecture transforms the board from a complex and power hungry card to a simpler, more power/area efficient and modular card that offers high manufacturing yields and robust quality and reliability in system performance. The device integration can be vertical/horizontal, monolithic/hybrid, or a combination thereof.

Figure 4:
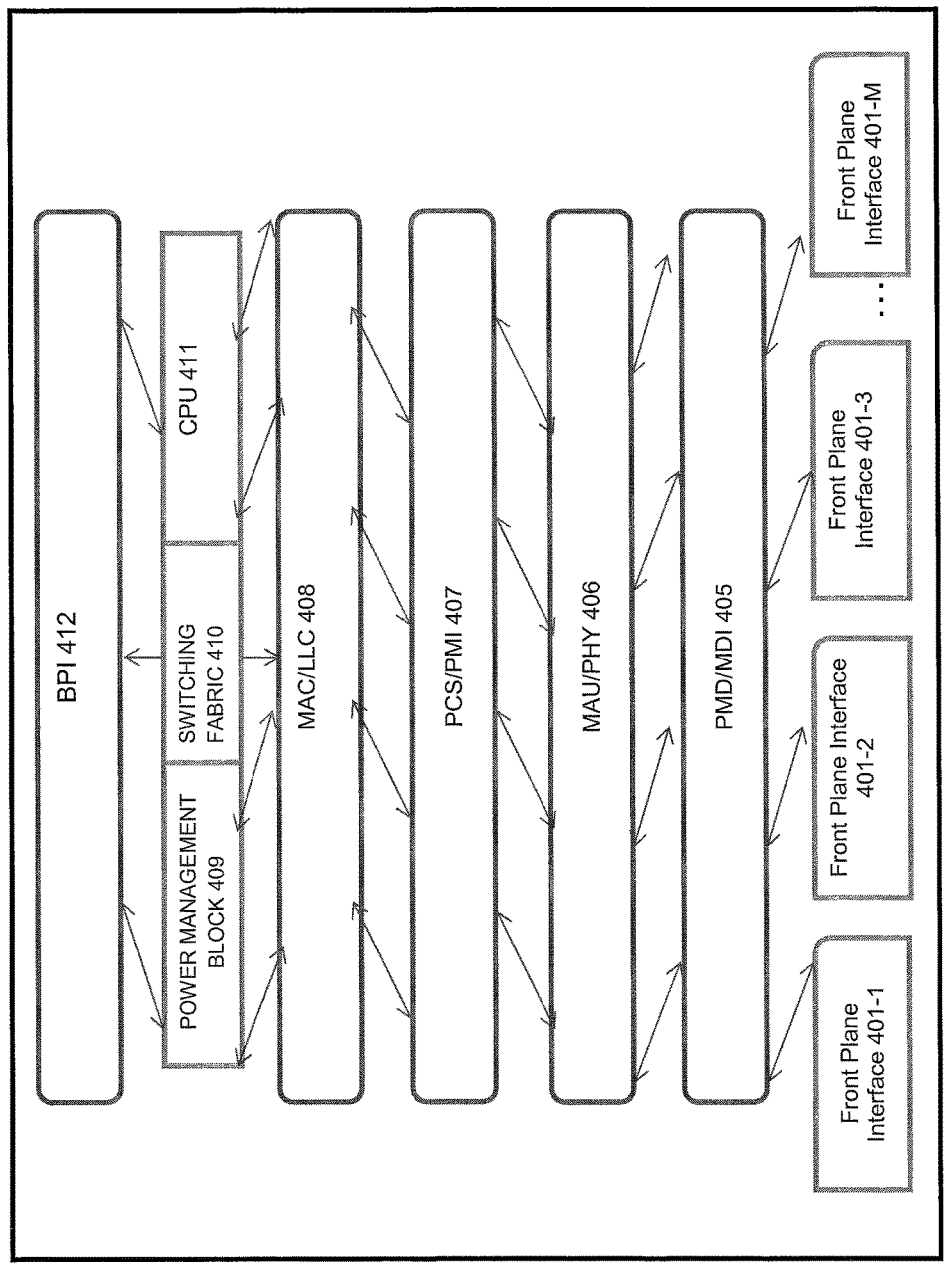
FIG. 4 shows an existing system, where a multi-port network switch having X-number of ports consumes Y amount of power and takes up Z amount of real estate.

FIG. 4 shows the existing switching architecture which has multiple layers of interfaces on the PCB. The PCB connections between the various layers on the same card result in high number of interfaces leading to higher layer and complex board resulting in greater power dissipation and larger area.

Generically speaking, a TOR/NAC switch may have 'X' number of network ports. In FIG. 4 showing an existing art, there are X ports in the front plane interface (FPI) consisting of M number of interface modules 401-1, 401-2, . . . 401-M, but they are not distributed between N number of elemental units within the system. Instead there is a discrete layer 405 of media dependent interface (MDI) of physical media dependent (PMD) devices. There may also be medium attachment units (MAU) 406 for local area networks. For the media access control (MAC)/logical link control layer (LLC) 408, a separate interface layer is required, which is the physical coding sublayer (PCS)/physical media independent (PMI) sublayer 407. In addition, separate interfaces are required for the switching fabric 410, the central processing unit (CPU) 411 that manages the ports, and the power management block 409. Finally, another layer of interfaces is required to communicate with the back plane interface (BPI) 412. All these separate interfaces result in increase of number of layers in a PCB, and leads to higher power consumption. The new architecture in FIG. 5 counteracts this problem by eliminating many of these interfaces.

Figure 5:
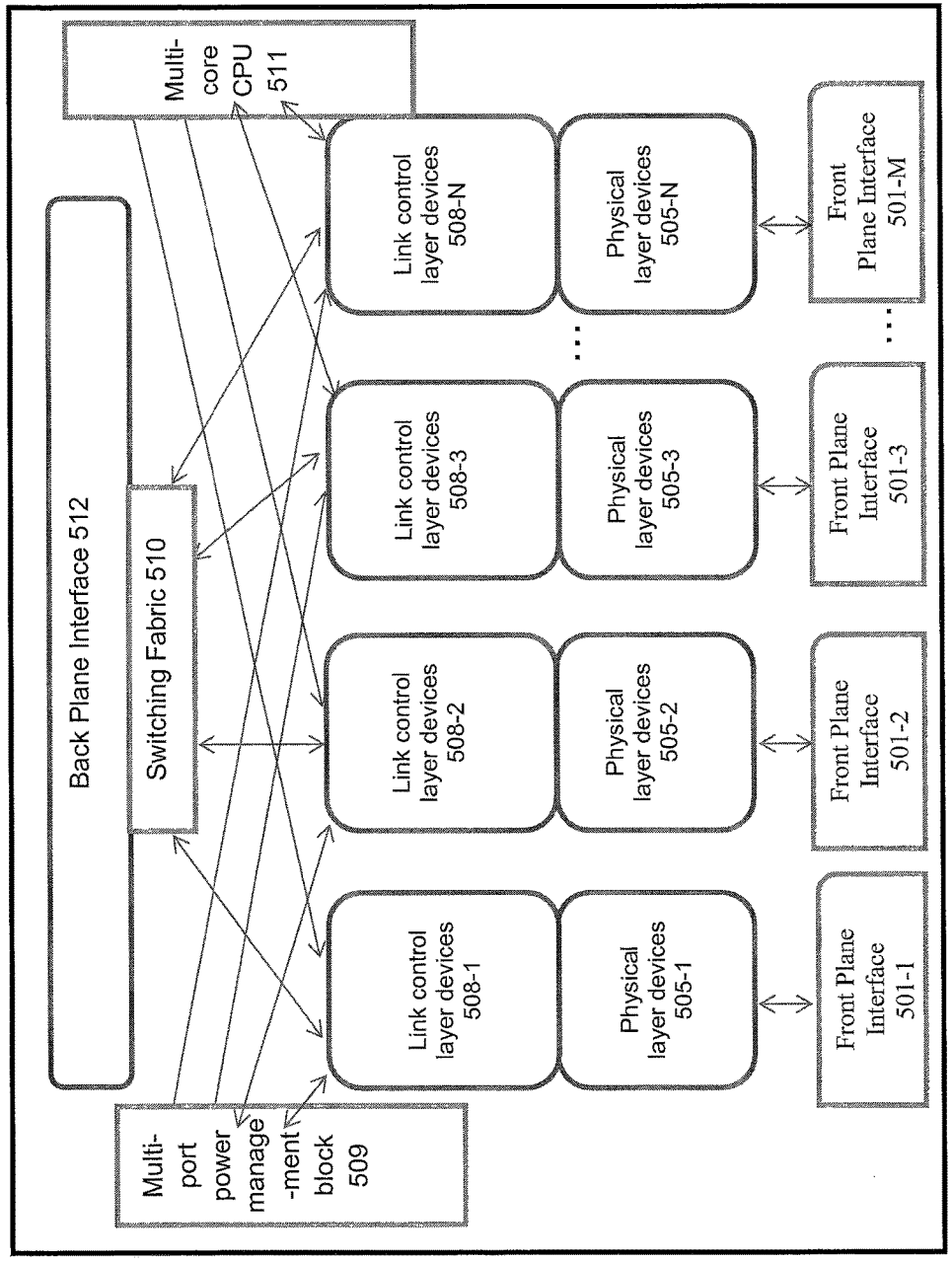
FIG. 5 shows the new and improved architecture according to an embodiment of the present disclosure, wherein a multi-port network switch having X-number of ports consumes approximately Y/N amount of power and takes up Z/N amount of real estate because of the compact design and integrated circuit implementation, where N is the number of elemental units in the TX4M™ system.

If the X number of ports are distributed among 'M' number of optical modules, as in FIG. 5, then the number of modules required is: M=X/A, where, each of the optical modules has 'A' number of ports arranged in a 'a×b' (a rows and b columns) matrix configuration in the corresponding network interface module, such that: a×b=A. For example, if A=8, the 'a×b matrix can have these configurations: 1×8, 2×4.

The total area taken by the system and the power consumed by the system in FIG. 5 are both scaled down approximately by a factor of 'N' (as compared to the system in FIG. 4) for 'X' number of network ports because of the integrated circuit implementation of the scalable architecture having N number of identical elemental units. In other words, FIG. 4 shows an existing system, where a multi-port network switch having X-number of ports consumes Y amount of power and takes up Z amount of real estate. FIG. 5 shows the new and improved architecture according to an embodiment of the present disclosure, wherein a multi-port network switch having X-number of ports consumes approximately Y/N amount of power and takes up Z/N amount of real estate because of the compact design and integrated circuit implementation, where N is the number of elemental units in the TX4M™ system.

In an embodiment shown in FIG. 5, the front plane interface (FPI) comprises an arrangement of 1×A ports in M number of the optical module interfaces 501-1, 501-2, . . . 501-M coupled to varying flavors of PMD/MDI (physical medium dependent/media dependent interface) devices. These devices in turn are coupled to PHY (physical) layer devices without additional interface layer because of IC implementation. The combined PMD/MDI and MAU/PHY devices are shown as the physical layer device ICs 505-1, 505-2, . . . , 505-N. In one embodiment, M=N, but M and N do not have to be the same number in the scalable architecture.

The PHY layer ICs in turn are coupled to Application Specific Integrated Circuit (ASIC) devices 508-1, 508-2, . . . , 508-N, which may be integrated (monolithically or hybridly) with their respective PCS/PMI (physical coding sublayer, physical medium independent) and MAC/LLC (media access/link layer controller) devices. A pivotal component of the switch is a multi-core CPU 511. The multi-core CPU handles the port management and port reconfiguration logic. It is capable of dynamic port aggregation/de-aggregation based on required front-panel bandwidth demanded by the user. Persons skilled in the art would appreciate that it is possible to eventually integrate the switch fabric 510 onto the network-on-a-chip. Each port of a multi-port switch fabric 510 contains an integrated serializer/deserializer (SERDES) that handles raw or encrypted data streams. Switch fabric chip 510 may have its own interface with the port-management CPU and switching management logic. A back plane interface 512 is integrated to the switching fabric 510, eliminating another layer of interfaces.

In summary, FIG. 5 shows the new art (re-architected ESS system) with different partitioning resulting in much lower number of interfaces between the physical and data link layer, thus significantly reducing PCB layers, board complexity and therefore reducing the overall power dissipation and area by a factor of N. A multi-port power management module 509 is coupled to the array of the link control layer devices, wherein the power management module intelligently manages power according to the dynamic bandwidth provisioning in each network port. The only components common between the existing art (FIG. 4) and new art (FIG. 5) are the front-plane (FPI) and back-plane interfaces (BPI). Each elemental unit in the new art comprises a physical layer device circuit unit 505, and a link control layer device circuit unit 508 corresponding to an external network interface module 501. In an embodiment, the multi-port power management module 509 may comprise an array of sub-modules, each sub-module coupled to a corresponding link control layer device 509. In an even more integrated embodiment, each elemental unit will even have its own FPI 501. The new art is fully compliant with open network platforms, for example, the Open System Interconnection (OSI) model. Further, though not shown in FIG. 5, the system further includes a memory management module that dynamically allocates the required amount of memory to each port based on the bandwidth partitioning.

The FPI/BPI interfaces are not restricted to fiber optic modules or small form factor pluggable (SFP) modules, but can incorporate either fiber or copper-wire modules with proper PMD/MDI devices. For fiber, the optical modules can include XSFP+ (variants of SFP, with the '+' indicating compliance with higher speed of networking) and variants of CXXs ('C' stands for 100 GBit) or a combination of fiber copper interfaces at varying speeds. An example of of CXX may be CFP (C form factor pluggable). Selectable functions for front plane interface (FPI) may be implemented in FPGAs for integration of front plane interface optics on host or on pluggable modules.

Persons skilled in the art would appreciate that aspects of the disclosure can be implemented in any convenient form. The descriptions above are intended to be illustrative, not limiting. Thus, modifications may be made to the embodiments as described without departing from the scope of the claims set out below.

The invention claimed is:

1. A power-efficient elemental scalable system (ESS) implementing a scalable multi-port network architecture, the system having a multi-port front-plane interface (FPI) comprising an external array of network interface modules (NIMs), with FPI physical media dependent (FPI PMD/PHY) devices, for receiving incoming network signals and transmitting outgoing network signals, each NIM having a plurality of network ports, the system comprising:
an array of media access control (MAC) layer devices implemented on a system-on-a-chip (SOC), each MAC layer device acting as a MAC host comprising physical layer devices and corresponding link control layer devices coupled together without an interface layer in between, each MAC layer device coupled to a corresponding NIM, wherein the FPI PMD/PHY devices are on the MAC host or in the NIM external to the MAC host, and wherein the incoming network signal and the outgoing network signal are processed on the MAC host or externally in the NIM;
a multi-core central processing unit (CPU) implemented on another SOC, wherein the multi-core CPU is coupled to the array of MAC layer devices on a multi-chip module (MCM), and is programmed to dynamically provision appropriate bandwidth to each network port in the multi-port network;
a switching fabric coupled to the array of the MAC layer devices;
a back-plane interface coupled to the switching fabric without an interface layer in between,
wherein the switching fabric and the back-plane interface jointly control switching and routing of network paths in the multi-port network; and
a multi-port power management module coupled to the array of the MAC layer devices, wherein the power management module intelligently manages power according to the dynamic bandwidth provisioning in each network port.

2. The system of claim 1, wherein the scalable multi-port network architecture is compatible with the multi-layer open networking model.

3. The system of claim 2, wherein the open networking model is suitable for one or more of telecommunication, data communication, cloud computing, data center switching, defense applications, and consumer applications.

4. The system of claim 1, wherein the multi-port power management module comprises an array of sub-modules, each sub-module coupled to a corresponding MAC layer device.

5. The system of claim 1, wherein the SOC uses one or more of the following semiconductor processing technologies: complementary metal oxide semiconductor (CMOS), Bi-CMOS, silicon germenium (SiGe), gallium arsenide (GaAs) based integrated components, photonic integrated circuits, and, silicon photonics.

6. The system of claim 1, wherein the physical layer devices and the corresponding link control layer devices are fabricated monolithically on a same substrate of the SOC, and packaged together to form a MAC layer device.

7. The system of claim 1, wherein the system is implemented as a combination of SOCs and MCMs including the array of MAC layer devices, the multi-core CPU, the multi-port power management module, and the switching fabric.

8. The system of claim 1, wherein 'X' number of network ports are distributed between 'N' number of identical elemental units, each elemental unit comprising a MAC layer device corresponding to an external NIM, wherein the FPI PMD/PHY devices are on the MAC host or in the NIM external to the MAC host.

9. The system of claim 8, wherein each of the NIMs in the FPI has 'A' number of ports arranged in a 'a×b' matrix configuration in the corresponding NIM, such that the multiplication of 'a' and 'b' yields 'A'.

10. The system of claim 8, wherein the total area taken by the system and the power consumed by the system are both scaled down approximately by a factor of 'N' for 'X' number of network ports because of the SOC implementation of the scalable architecture with 'N' number of identical elemental units.

11. The system of claim 1, wherein the incoming network signals comprise optical signals, which are converted to electronic signals for conditioning, processing and bandwidth provisioning purposes on the SOC, and then re-converted into optical signals again for transmission.

12. The system of claim 1, wherein the NIMs comprise one or more of the following standardized pluggable fiber optic interfaces: RJ-45, XSFP+ (variants of small form factor pluggable plus), Quad SFP (QSFP), CXX (variants of C-form factor pluggable).

13. The system of claim 1, wherein the NIMs comprise a combination of fiber optic, free-space optic and copper interfaces in pluggable modules with the FPI PMD/PHY devices on the MAC host or external to the MAC host.

14. The system of claim 1, wherein the multi-core CPU manages network partitioning for dynamic bandwidth provisioning.

15. The system of claim 14, wherein the system further includes a memory management module that dynamically allocates the required amount of memory to each port based on the network partitioning for the dynamic bandwidth provisioning.

16. The system of claim 14, wherein the multi-core CPU enables programmability of data plane with selectable functions controlled and managed by a control plane and a management plane respectively in a software defined network (SDN).

17. The system of claim 1, wherein the SOCs and MCMs use one or more of the following semiconductor processing technologies: complementary metal oxide semiconductor (CMOS), Bi-CMOS, silicon germenium (SiGe), gallium arsenide (GaAs) based discrete components.

* * * * *